UNITED STATES PATENT OFFICE.

THILO KROABER, OF BASEL, SWITZERLAND, ASSIGNOR TO THE FIRM OF SOCIETY OF CHEMICAL INDUSTRY IN BASLE, OF BASEL, SWITZERLAND.

MONOAZO DYE AND PROCESS OF MAKING SAME.

No. 805,918.     Specification of Letters Patent.     Patented Nov. 28, 1905.

Application filed May 23, 1905. Serial No. 261,896. (Specimens.)

*To all whom it may concern:*

Be it known that I, THILO KROABER, chemist and doctor of philosophy, a subject of the Duke of Saxe-Altenburg, and a resident of Basel, Switzerland, have invented new and useful Improvements in the Manufacture of Monoazo Dyestuffs, of which the following is a clear and complete specification.

The invention relates to the manufacture of new monoazo dyestuffs derived from 1-amido-2-acidyloxynaphthalenesulfonic acids and sulfonic acids of 1-8-dioxynaphthalene, according to the general process described in an application for Letters Patent executed by me and Dr. Karl Jagerspacher, said application having been filed May 23, 1905, and bearing the Serial No. 261,897.

These new monoazo dyestuffs dissolve in water with violet-blue to blue coloration, in concentrated sulfuric acid with greenish-blue coloration, and dye unmordanted wool in clear blue shades which become bluish green on treatment with chromium compounds—as, for instance, potassium bichromate.

The following example illustrates the manufacture of the new dyestuffs: 23.9 kilos of 1:2-amidonaphthol-4-sulfonic acid are dissolved in two hundred liters of water with aid of forty-nine kilos of soda-lye of 30° Baumé and acetylized by means of eleven kilos of acetic anhydrid at a temperature below 0° centigrade, while good stirring is maintained. After a few minutes there are added to the solution, which should have neutral or feebly-alkaline reaction, seven kilos of solid sodium nitrite, and the whole is acidified at 0° centigrade by adding all at once thirty kilos of ordinary hydrochloric acid, whereupon the mass immediately solidifies without any evolution of gas to a yellow crystalline magma. This diazo compound is allowed to flow into a solution of thirty-two kilos of 1-8-dioxynaphthalene-3-6-disulfonic acid, containing an excess of soda. A violet dyestuff is at once formed which by continued stirring passes to a blue dyestuff, whose isolation is conducted, as usual, by salting out. It dissolves in water with a pure violet-blue coloration and in concentrated sulfuric acid with a green-blue coloration. It dyes wool in an acid bath blue pure tints, which pass to bluish green on treatment with chromium compounds. Analogous dyestuffs are obtained if 1-8-dioxynaphthalene-3-6-disulfonic acid be replaced by other sulfo derivatives of 1-8-dioxynaphthalene—as, for instance, 1-8-dioxynaphthalene-4-monosulfonic acid, 1-8-dioxynaphthalene-2-4-disulfonic acid, or 1-8-dioxynaphthalene-4-6-disulfonic acid.

Instead of the 1-2-amidonaphthol-4-sulfonic acid mentioned in the example other sulfo derivatives of 1-2-amidonaphthol—as, for instance, 1-2-amidonaphthol-6-sulfonic acid, 1-2-amidonaphthol-4-6-disulfonic acid, or 1-2-amidonaphthol-3-6-disulfonic acid—may be employed.

What I claim is—

1. The process for the manufacture of monoazo dyestuffs, which consists in acidylizing 1-2-amidonaphtholsulfonic acids in the hydroxyl group, then diazotizing the so-obtained 1-amido-2-acidyloxynaphthalenesulfonic acids and combining the resulting diazo compounds with sulfonic acids of 1:8-dioxynaphthalene.

2. The process for the manufacture of monoazo dyestuffs, which consists in acetylizing 1-2-amidonaphtholsulfonic acids in the hydroxyl group, then diazotizing the so-obtained 1-amido-2-acetyloxynaphthalenesulfonic acids and combining the resulting diazo compounds with sulfonic acids of 1-8-dioxynaphthalene.

3. The process for the manufacture of a monoazo dyestuff, which process consists in acetylizing 1-2-amidonaphthol-4-sulfonic acid in the hydroxyl group, then diazotizing the obtained 1-amido-2-acetoxynaphthalene-4-sulfonic acid and combining the resulting diazo compound with 1-8-dioxynaphthalene-3-6-disulfonic acid.

4. As new products, the monoazo dyestuffs derived from sulfonic acids of 1-2-amidonaphthol and sulfonic acids of 1-8-dioxynaphthalene, which dyestuffs dissolve in water with violet-blue to blue coloration, and in concentrated sulfuric acid with greenish-blue coloration and dye unmordanted wool in clear blue shades, which shades become bluish green on treatment with chromium compounds.

5. As a new product, the monoazo dyestuff derived from 1-2-amidonaphthol-4-sulfonic acid, and 1-8-dioxynaphthalene-3-6-disulfonic acid, which dyestuff is soluble in water with a pure violet-blue color, soluble in concentrated sulfuric acid with a greenish-blue color and dyes unmordanted wool in clear blue shades, which become bluish green on treatment with chromium compounds.

In witness whereof I have hereunto signed my name, this 9th day of May, 1905, in the presence of two subscribing witnesses.

THILO KROABER.

Witnesses:
ALBERT GRAETE,
AMAND RITTER.

Correction in Letters Patent No. 805,918.

It is hereby certified that the name of the patentee in Letters Patent No. 805,918, granted November 28, 1905, for an improvement in "Monoazo Dyes and Processes of Making Same," was erroneously written and printed "Thilo Kroaber," whereas the said name should have been written and printed *Thilo Kröber;* and that the said Letters Patent should be read with this correction therein that the same may conform to the record of the case in the Patent Office.

Signed and sealed this 12th day of December, A. D., 1905.

[SEAL.]

W. W. Mortimer,
*Chief Div. D.*

F. I. ALLEN,
*Commissioner of Patents.*